(12) United States Patent
Matsushima

(10) Patent No.: US 7,034,878 B2
(45) Date of Patent: Apr. 25, 2006

(54) CAMERA APPARATUS AND METHOD OF TAKING PICTURES INCLUDING SIMPLIFIED PROCESSING

(75) Inventor: Yuki Matsushima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1026 days.

(21) Appl. No.: 09/726,559

(22) Filed: Dec. 1, 2000

(65) Prior Publication Data

US 2004/0201717 A1 Oct. 14, 2004

(30) Foreign Application Priority Data

Dec. 1, 1999 (JP) ............................................ 11-342184
Nov. 29, 2000 (JP) ........................................ 2000-363904

(51) Int. Cl.
*H04N 5/202* (2006.01)
*H04N 5/217* (2006.01)
*H04N 5/208* (2006.01)
*H04N 3/14* (2006.01)

(52) U.S. Cl. .................. 348/333.03; 348/254; 348/241; 348/252; 348/273

(58) Field of Classification Search ............ 348/333.03, 348/241, 252, 254, 273
See application file for complete search history.

(56) References Cited

U.S. PATENT DOCUMENTS 4,943,850 A * 7/1990 Asaida ........................ 348/262
5,245,432 A * 9/1993 Jaffray et al. ................ 348/578
5,706,049 A * 1/1998 Moghadam et al. ... 348/333.03
6,072,962 A * 6/2000 Parulski ....................... 396/311
6,256,423 B1 * 7/2001 Krishnamurthy et al. ... 382/251
6,476,868 B1 * 11/2002 Kaji et al. ............. 348/333.12
6,690,419 B1 * 2/2004 Silverbrook ................ 348/239
6,774,943 B1 * 8/2004 Kao et al. .................... 348/252

FOREIGN PATENT DOCUMENTS

| JP | 6-138377 | | 5/1994 |
|---|---|---|---|
| JP | 8-46833 | | 2/1996 |
| JP | 9-326025 | | 12/1997 |
| JP | 10-191064 | | 7/1998 |
| JP | 10191064 | A * | 7/1998 |
| JP | 10-229544 | | 8/1998 |
| JP | 11-110551 | | 4/1999 |
| JP | 2000-13608 | | 1/2000 |
| JP | 2000-224465 | | 8/2000 |

* cited by examiner

*Primary Examiner*—Wendy R. Garber
*Assistant Examiner*—Timothy J Henn
(74) *Attorney, Agent, or Firm*—Oblon, Spivak, McClelland, Maier & Neustadt, P.C.

(57) ABSTRACT

A camera apparatus including a camera unit which acquires an image, a line-of-sight detection unit which detects a point of eye fixation of a user within a camera screen, and an importance computation unit which determines levels of importance for respective areas of the image acquired by the camera unit in accordance with the detection by the line-of-sight detection unit. Also included is a number-of-gray-scale-level determining unit which changes a number of gray scale levels for the respective areas of the image in response to the determination by the importance computation unit.

16 Claims, 15 Drawing Sheets

BLOCK DIAGRAM SHOWING A FUNCTIONAL BLOCK CONFIGURATION OF AN IMAGE PROCESSING UNIT.

DRAWING SHOWING AN EMBODIMENT OF A CONFIGURATON OF A LINE-OF-SIGHT DETECTION UNIT.

DRAWING SHOWING THE WAY A DISPLAY SCREEN IS DIVIDED INTO A PLURALITY OF BLOCKS IN ORDER TO DETECT A POINT OF FIXATION BY THE UNIT OF ONE BLOCK.

DRAWING SHOWING THE IMPORTANCE OF THE PIXEL OF INTEREST AND POSITIONAL RELATIONSHIP BETWEEN THE AREA OF IMPORTANCE AND THE PIXEL OF INTEREST.

DRAWING SHOWING A GAUSIAN DISTRIBUTION FUNCTION THAT DEFINES LEVELS OF IMPORTANCE.

DRAWING SHOWING THE WAY TWO AREAS OF IMPORTANCE ARE SPECIFIED IN AN IMAGE.

DRAWING SHOWING THE IMPORTANCE OF POSITION(X,Y) IN THE IMAGE WITH RESPECT TO THE FIRST AREA OF IMPORTANCE AND THE SECOND AREA OF IMPORTANCE.

DRAWING SHOWING A CONTOUR PATTERN OF IMPORTANCE IN A CASE WHERE THE AREA OF IMPORTANCE IS DEFINED AS A SMALL ELLIPSE REGION OF THE IMAGE.

CENTER OF AREA OF IMPORTANCE
i.e., FIXATION POINT OF USER EYE

DRAWING SHOWING AN EXAMPLE OF IMPORTANCE THAT IS QUANTIZED INTO FIVE LEVELS.

BLOCK DIAGRAM SHOWING A FUNCTIONAL BLOCK CONFIGURATION OF AN IMAGE PROCESSING UNIT.

DRAWING SHOWING QUANTIZED IMPORTANCE LEVELS THAT ARE ASSIGNED TO RESPECTIVE AREAS OF AN IMAGE WITH REFERENCE TO AN EXAMPLE IN WHICH THE AREA OF IMPORTANCE IS AN ELLIPSE SHAPE.

EXAMPLE OF BLOCKS INTO WHICH AN IMAGE IS DIVIDED HORIZONTALLY AND VERTICALLY.

EXAMPLE OF BLOCKS HAVING DIFFERENT SHAPES INTO WHICH AN IMAGE IS DIVIDED.

BLOCK DIAGRAM SHOWING AN EXAMPLE OF A HARDWARE CONFIGURATION INCLUDING AN IMAGE OUTPUT APPARATUS.

FLOWCHART SHOWING A FIRST EMBODIMENT OF A PROCESS OF MAKING IMAGE QUALITY VARY DEPENDING ON LEVELS OF IMPORTANCE.

FLOWCHART SHOWING A SECOND EMBODIMENT OF A PROCESS OF MAKING IMAGE QUALITY VARY DEPENDING ON LEVELS OF IMPORTANCE.

FIG.17

DRAWING SHOWING A CONFIGURATION OF A COLOR FILTER IN THE CASE OF A CAMERA DEVICE BEING A PRIMARY COLOR ARRAY CCD.

| G | B | G | B | G |
|---|---|---|---|---|
| R | G | R | G | R |
| G | B | G | B | G |
| R | G | R | G | R |
| G | B | G | B | G |

FIG.18

DRAWING SHOWING THE PIXCEL OF INTEREST AND FOUR NEIGHBORING PIXELS FOR THE PURPOSE OF COLOR INTERPOLATION PROCESSING.

|   | a |   |
|---|---|---|
| b | X | c |
|   | d |   |

DRAWING SHOWING AN EXAMPLE OF A WIDE AREA OF INTERPOLATION REFERENCE THAT CORRESPONDS TO THE CASE OF GREAT IMPORTANCE.

FLOWCHART SHOWING A THIRD EMBODIMENT OF A PROCESS OF MAKING IMAGE QUALITY VARY DEPENDING ON LEVELS OF IMPORTANCE.

DRAWING SHOWING THE PIXEL OF INTEREST AND NEIGHBORING PIXELS FOR THE PURPOSE OF SHARPNESS ENHANCEMENT PROCESSING.

DRAWING SHOWING A NON-LINEAR TRANSFORMATION APPLIED TO LAPLACIAN OPERATION.

FLOWCHART SHOWING A FOURTH EMBODIMENT OF A PROCESS OF MAKING IMAGE QUALITY VARY DEPENDING ON LEVELS OF IMPORTANCE.

CAMERA APPARATUS AND METHOD OF TAKING PICTURES INCLUDING SIMPLIFIED PROCESSING

BACKGROUND OF THE INVENTION

1. Field of the Invention

The present invention generally relates to a camera apparatus, and particularly relates to a digital camera which attends to different image processing, depending on different importance of image areas.

2. Discussion of the Background

Conventionally used cameras are mostly analog cameras that expose films to light. Data photographed by such analog cameras are generally referred to as "photographs". In the art of analog cameras, various schemes have been presented to attend to automatic control of camera functions such as focus adjustment and exposure correction, which are often difficult to users who are not familiar with cameras. Such automatic control is performed, for example, by providing a function to detect a direction of sight to identify an area of the finder that the user is looking at, and by focusing at the point of fixation.

Japanese Patent Laid-open Application No. 6-138377 discloses an analog camera, which automatically adjusts focus by use of a sight detection means for detecting a fixation point of the user eye and a focus detection means for detecting focus points at a plurality of positions. Japanese Patent Laid-open Application No. 8-46833 discloses an analog camera which attends to automatic focus control and automatic exposure control by use of a sight detection means for detecting the fixation point of the user eye.

Cameras that are generally referred to as a digital still camera (hereinafter, "digital camera") convert optical image data acquired through a solid camera device such as a CCD into electrical image data, and store the image data in memory such as a memory card after proper image processing and image compression.

Data acquired by a digital camera is referred to as an image since it is represented by electrical signals. With recent development of digital medium and the Internet, there has been an increasing demand for digital cameras. Different from analog cameras, digital cameras allows photographed images to be immediately checked, which provides an opportunity to take another picture in case of failure, and, also, does not require development of films. Such features explain part of the reasons why a market for digital cameras has been expanding. For example, there are increasing numbers of users who use digital cameras instead of memo notes when they attend business shows.

In the digital cameras, process steps that correspond to film development of analog cameras may include 1) image processing and 2) image compression. At the image processing step 1), color correction is necessary, for example, if a single plate camera device of a general type having only one color per pixel is used. Further, various image processing will be performed to improve image quality by attending to aperture processing (i.e., edge enhancement or sharpness enhancement), exposure correction, etc.

Even when analog cameras are used, correction to some extent may be made at the time of film development. Sharpness of the photograph and condition of exposure are almost uniquely determined by graininess of the film (i.e., film sensitivity) and focusing at the time of taking pictures.

Digital cameras, on the other hand, can perform image processing properly, thereby producing an image having better image quality than an original image obtained at the time of taking pictures. Further, image processing can improve sharpness as well as attend to binary processing, which facilitates use of digital cameras for taking pictures of texts while analog cameras are rarely used for such purpose.

Image processing is vital in digital cameras as described above, and numbers of patent applications have been filed in the art of image processing. Japanese Patent Laid-open Application No. 11-110551 discloses a color discriminating device, which is used to eliminate black area noise caused by a failure to determine colors during color correction process in the digital cameras. If the area of application is not restricted to digital cameras, there are numerous numbers of image processing schemes in the art of image processing of digital images, and these schemes are generally applicable to digital cameras. For example, Japanese Patent Laid-open Application No. 10-191064 discloses an image filtering method and apparatus that can enhance sharpness and remove noise at the same time by applying filtering with weight factors that reflect the magnitude of contrast in the vertical and horizontal directions around a pixel of interest.

In conventional schemes in the image processing of digital cameras, processing is generally applied across the board to the entire image. In some schemes, however, images are divided for processing for the image compression processing 2) that is performed prior to storage of image data in memory such as a memory card.

Japanese Patent Laid-open Application No. 10-229544, for example, assumes a direct connection of a digital camera and a printer. Since the size of memory medium provided in the digital camera is limited, the image processing apparatus disclosed in this document divides an image prior to compression, rather than compresses/decompresses the entirety of processed data at once.

Further, various image processing apparatuses that takes advantage of the fact that image data is acquired by a camera are also known to date.

Japanese Patent Laid-open Application No. 9-326025, for example, discloses an image processing apparatus which retrieves only the image data of an object located at a particular distance by storing range data that is indicative of distance between the camera and objects. In this scheme, each portion of the acquired image can be extracted according to an indication of distance, thereby making it possible to take into account intention of the camera user subsequently at the time of editing.

This scheme, however, requires a memory area for storing range data. In the worst case, a memory space is necessary that stores range data for each pixel of the image. A typical digital camera at present has 1.5 million pixels, and the number of pixels will continue to increase in the future. This scheme is thus not realistic.

Moreover, neither Japanese Patent Laid-open Application No. 10-229544 nor Japanese Patent Laid-open Application No. 9-326025 takes advantage of the fact that image data to be processed is acquired by use of a camera.

Image data that is acquired by use of a camera should be treated in accordance with its nature. If general image processing is applied without any regard to this fact, processing time becomes increasingly lengthy as processing becomes increasingly sophisticated in order to improve image quality.

Ideally, image quality should be as high as possible across the entire image regardless of greater or smaller importance of different image portions. If the highest image quality is to be maintained for the entire image, however, processing time becomes lengthy. This is the reason why a user using a digital camera often misses a chance to take a picture at an important moment because of a shutter lag, which is a time period from a moment at which a shutter button is pressed first to a moment at which the shutter button can be pressed again, and is also referred to as a photographing interval. If the shutter lag is designed to be shorter to enhance the performance that is expected of a camera, processing time set aside for image processing, image compression, and image storing needs to be shortened.

As described above, conventional digital still cameras have drawbacks in that the user is likely to miss a shutter chance because of a lengthy processing time if sophisticated processing steps are used in the image processing to improve image quality.

In the art of analog cameras, on the other hand, there is a known scheme that uses a function to detect a direction of user sight for the purpose of controlling focus and exposure. In analog cameras, however, such function to detect a direction of user sight has only been used for controlling of focus and exposure, and is devoid of any concept that suggests use of such function for improving image quality. When the drawbacks of digital cameras regarding the lengthy image processing time is taken into consideration, use of a function to detect a direction of user sight in digital cameras will make it possible to identify areas of importance in the acquired image in the manner that reflects intension of the camera user.

SUMMARY OF THE INVENTION

Accordingly, it is an object of the present invention to provide a camera apparatus which can reduce processing time by simplifying image processing in areas of small importance and by taking advantage of the fact that the image data is acquired by a camera.

In detail, it is an object of the present invention to provide a digital camera which can improve image quality in a short processing time by determining image quality of image areas to reflect the intension of a user based on the function of detecting a line of sight of the user eye and by simplifying the image processing in the areas of small importance.

A camera apparatus according to the present invention includes a camera unit which acquires an image, a line-of-sight detection unit which detects a point of eye fixation of a user within a camera screen, an importance computation unit which determines levels of importance for respective areas of the image acquired by said camera unit in accordance with the detection by said line-of-sight detection unit, and a number-of-gray-scale-level determining unit which changes a number of gray scale levels for the respective areas of the image in response to the determination by the importance computation unit.

In the camera apparatus as described above, the number of gray scale levels is changed according to the levels of importance corresponding to the respective areas of the image, and is decreased in the areas of small importance, thereby producing an image having varying image quality for respective areas to reflect the intension of the camera user. By decreasing the number of gray scale levels in the areas of small importance, it is possible to reduce the memory size and to step up the processing speed of image processing that is to be performed at later stages.

According to another aspect of the present invention, a camera apparatus includes a camera unit which acquires an image, a line-of-sight detection unit which detects a point of eye fixation of a user within a camera screen, an importance computation unit which determines levels of importance for respective areas of the image acquired by said camera unit in accordance with the detection by said line-of-sight detection unit, and a color interpolation processing unit which changes color interpolation processing for the respective areas of the image in response to the determination by the importance computation unit.

In the camera apparatus as described above, the color interpolation processing is changed according to the levels of importance corresponding to the respective areas of the image, thereby producing an image having varying image quality for respective areas to reflect the intension of the camera user. By simplifying the color interpolation processing in the areas of small importance, it is possible to achieve high-speed color interpolation processing.

According to another aspect of the present invention, a camera apparatus includes a camera unit which acquires an image, a line-of-sight detection unit which detects a point of eye fixation of a user within a camera screen, an importance computation unit which determines levels of importance for respective areas of the image acquired by said camera unit in accordance with the detection by said line-of-sight detection unit, and a sharpness enhancement processing unit which changes sharpness enhancement processing for the respective areas of the image in response to the determination by the importance computation unit.

In the camera apparatus as described above, the sharpness enhancement processing is changed according to the levels of importance corresponding to the respective areas of the image, thereby producing an image having varying image quality for respective areas to reflect the intension of the camera user. By simplifying the sharpness enhancement processing in the areas of small importance, it is possible to achieve high-speed sharpness enhancement processing.

According to another aspect of the present invention, a camera apparatus includes a camera unit which acquires an image, a line-of-sight detection unit which detects a point of eye fixation of a user within a camera screen, an importance computation unit which determines levels of importance for respective areas of the image acquired by said camera unit in accordance with the detection by said line-of-sight detection unit, and a noise removal processing unit which changes noise removal processing for the respective areas of the image in response to the determination by the importance computation unit.

In the camera apparatus as described above, the noise removal processing is changed according to the levels of importance corresponding to the respective areas of the image, thereby producing an image having varying image quality for respective areas to reflect the intension of the camera user. By simplifying the noise removal processing in the areas of small importance, it is possible to achieve high-speed noise removal processing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 17 is a drawing showing a configuration of a color filter in the case of a camera device being a primary color array CCD;

FIG. 18 is a drawing showing the pixel of interest and four neighboring pixels for the purpose of color interpolation processing;

DESCRIPTION OF THE PREFERRED EMBODIMENTS

Figure 1:
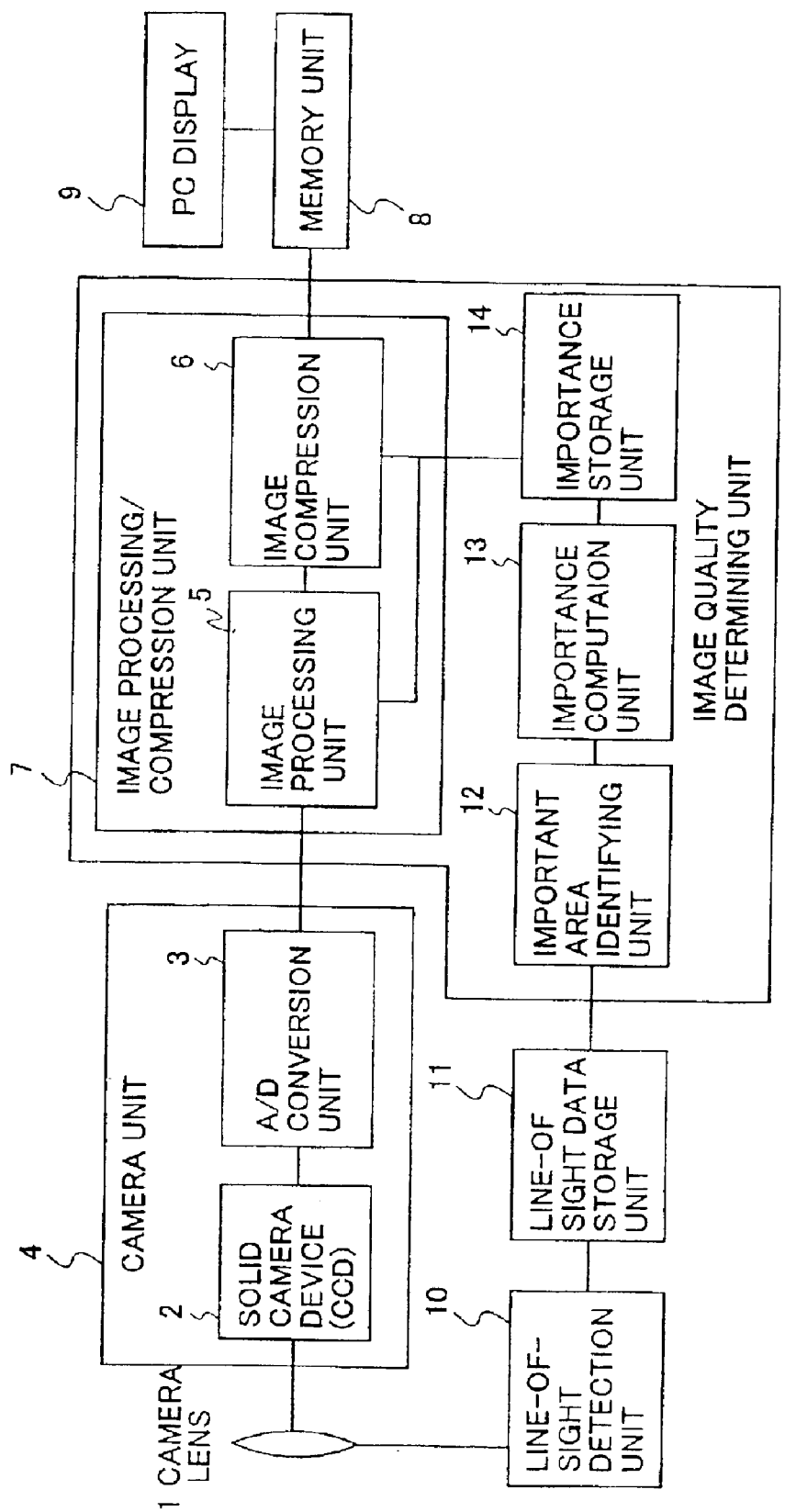
FIG. 1 is a block diagram showing a configuration of an embodiment of a digital camera according to the present invention.

Referring now to the drawings, wherein like reference numerals designate identical or corresponding parts throughout the several views, the present invention will be described.

In the following, a digital still camera according to the present invention will be described with reference to the accompanying drawings.

FIG. 1 is a block diagram showing an embodiment of a digital camera according to the present invention. In FIG. 1 are shown a camera lens 1, a solid camera device (CCD) 2, an A/D conversion unit 3, a camera unit 4 that includes the solid camera device 2 and the A/D conversion unit 3, an image processing unit 5, an image compression unit 6, an image processing/compression unit 7 that includes the image processing unit 5 and the image compression unit 6, a memory unit 8, a PC display 9, a line-of-sight detection unit 10, a line-of-sight data storage unit 11, an important area identifying unit 12, an importance computation unit 13, an importance storage unit 14, and an image quality determining unit 15 that includes the image processing/compression unit 7, the important area identifying unit 12, the importance computation unit 13, and the importance storage unit 14.

When the camera user see through the finder of the digital camera shown in FIG. 1 according to the embodiment of the present invention, the line-of-sight detection unit 10 detects a fixation point of the user eye. Data of the line of sight is temporarily stored in the line-of-sight data storage unit 11, and, then, the important area identifying unit 12 identifies areas of importance in the image. Further, the importance computation unit 13 computes importance of each area in the image, and the computed importance is stored in the importance storage unit 14. There are various available methods for detecting a fixation point of the user eye, and any one of these methods can be used in the present invention. An example of the line-of-sight detection unit 10 will be described later.

A CCD is only an example of the solid camera device 2, and the solid camera device 2 is not limited to the CCD. For the sake of description, the solid camera device is hereinafter described as a CCD. A CCD carries out photoelectric conversion of the object image formed by the optical camera lens 1, and outputs electrical signals.

After this, the A/D conversion unit 3 converts analog output signals of the CCD solid camera device 2 into digital signals.

The image processing unit 5 provided at the next processing stage performs various processing to improve image quality with respect to the digital signal outputs of the A/D conversion unit 3, and outputs image data. A detailed description of the image processing unit will be provided later.

The image compression unit 6 compresses the image data output from the image processing unit 5. The compressed image data is referred to as a data stream. Various schemes has been proposed to date with regard to image compression. As a compression method for compressing images acquired by digital cameras, a method of a well-established image compression algorithm such as JPEG has been used. Notwithstanding this, an image compression/decompression method that has been presented by the applicant, for example, may be used to achieve efficient image compression while maintaining image quality of important areas specified in the image. (Japanese Patent Application No. 10-175999: An image processing method specifies an important area in the image, and computes importance of retrieved image data by using as a parameter the distance between the area of importance and the location of the retrieved image data, followed by changing a rate of compression or a rate of decompression of each pixel of the image data in response to the computed importance.) In this manner, efficient compression is achieved by use of data of importance stored in the importance storage unit 14.

The image processing unit 5 and the image compression unit 6 are collectively referred to as the image processing/ compression unit 7. Further, the important area identifying unit 12, the importance computation unit 13, the importance storage unit 14, and the image processing/compression unit 7 are collectively called the image quality determining unit 15.

The image quality determining unit 15 is provided with a function to change image quality of image areas, depending on the position of the fixation point of the user eye. In this manner, the image quality determining unit 15 can provide image quality that reflects intension of the camera user. A detailed description of this aspect will be provided later.

The memory unit 8 stores the data stream therein. As the memory unit 8, a floppy disk, an MO, a memory card, etc., may be used, but the memory unit 8 is not limited to a particular structure. The memory unit 8 may be a memory device connected to a computer system via a cable, so that the digital camera is connected to the computer as an image input device.

The data stream stored in the memory unit 8 can be reproduced on the display 9 of a personal computer or the like. There are other forms of reproduction that are conceivable such as a printer output, and the form of reproduction is not limited to any particular embodiment.

In the following, a configuration of each unit relevant to the present invention in FIG. 1 will be described together with details of operation.

Figure 2:
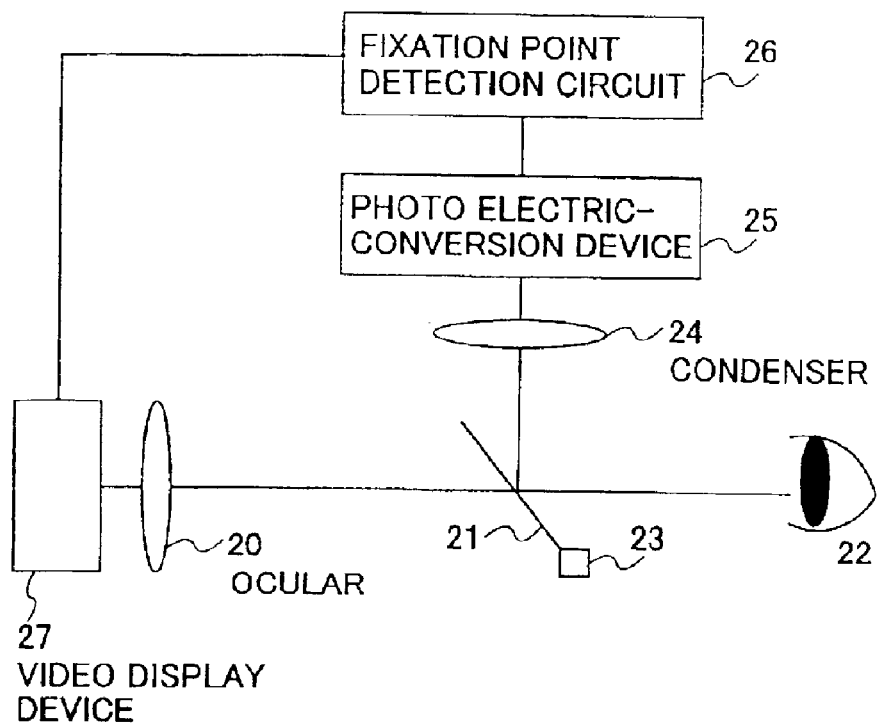
FIG. 2 is a drawing showing an embodiment of a configuration of a line-of-sight detection unit.
Figure 3:
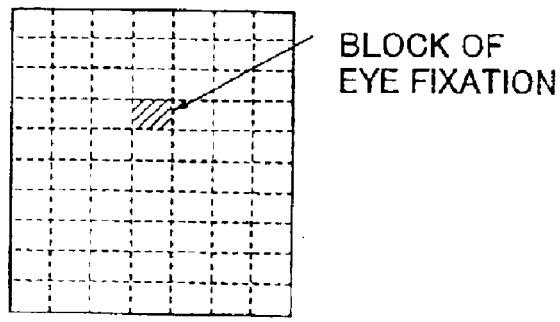
FIG. 3 is a drawing showing the way a display screen is divided into a plurality of blocks in order to detect a point of fixation by the unit of one block.

FIG. 2 is a drawing showing an embodiment of the line-of-sight detection unit 10.

The line-of-sight detection unit 10 includes an ocular 20, a dynamic mirror 21, an infrared light emission diode 23, a condenser 24, a photoelectric-conversion device 25, a fixation point detection circuit 26, and a video display device 27.

The dynamic mirror 21 allows passage of visible light and reflects infrared light, and is situated in front of the optical ocular 20. In front of the ocular 20, also, the infrared light emission diode 23 is provided to emit infrared light to an eye 22 of the camera user. The infrared beam emitted from the infrared light emission diode 23 is reflected by the eye 22 of the camera user, and is further reflected by the dynamic mirror 21 to reach the photoelectric-conversion device 25 after passing through the condenser 24. The condenser 24 is provided in such a position as to form an image of the iris of the eye 22 on the conversion plate of the photoelectric-conversion device 25.

The configuration described above forms an image on the conversion plate of the photoelectric-conversion device 25 where this image is an image of beam spot of the infrared light emission diode 23 superimposed on the eye 22 of the camera user.

The fixation point detection circuit 26 detects the position of the fixation point on the display screen of the video display device 27 based on relation between the position of the infrared beam spot and the position of the iris on the photoelectric conversion plate of the photoelectric-conversion device 25.

Here, the display screen may be divided into a plurality of blocks, and the fixation point may be detected by the unit of one block.

In what follows, the operation of the important area identifying unit 12 and the importance computation unit 13 will be described in detail.

As the simplest example, a case in which an area of importance is provided as a single point in the image will be described first. Namely, the area of importance is a single point that corresponds to the fixation point of the camera user detected by the line-of-sight detection unit 10. In the case where the fixation point is detected by the unit of one block, the area of importance is regarded as a center point of the block.

The important area identifying unit 12 identifies a single point as an "area of importance" based on the position of the fixation point of the user eye. In response, the importance computation unit 13 uses a formulae for computing importance based on a parameter indicative of a distance between the area of importance and any given point in the image data, thereby computing importance for each position in the image. The computation formulae for computing importance in a continuous scale may be represented as:

$$\text{Importance} = a\,X + b \tag{1}$$

a, b: real values,

X: distance from the area of importance

Figure 4:
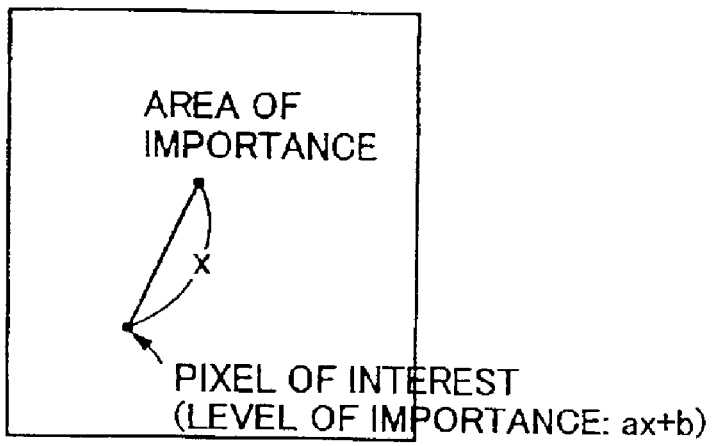
FIG. 4 is a drawing showing the importance of the pixel of interest and positional relationship between the area of importance and the pixel of interest.

FIG. 4 is a drawing showing importance of a pixel of interest and positional relationship between the pixel of interest and the area of importance.

As shown in FIG. 4, when a single point is given as the area of importance, the importance of the point of interest is computed as a linear function of the distance X between the point of interest and the area of importance.

In what follows, a description will be given with regard to a case in which the area of importance is provided as a small circular area in the image.

In such a case, a function that is applied to the area of interest has a distribution based on parameters that include the distance from the center of the small area, the size of the small area, and the magnitude at the center of the small area. Based on this distribution function, the importance of any given point is computed with respect to the image data.

The important area identifying unit 12 identifies the area of importance with respect to the object image by using the position of the fixation point of the user eye. In this example, the area of importance is defined as a small circular area around the point of fixation detected by the line-of-sight detection unit 10. This is done by determining the radius and center point of the circle that defines the area of importance.

The importance of each pixel can be represented by using a Gaussian function f(x). A Gaussian function is represented by the formulae as shown below as equation (2). In this representation, σ is a standard deviation of the distribution, and μ is an average, with x representing the distance from the average. Further, K is a constant for normalization.

$$f(x) = \{K/(2\pi\sigma^2)^{1/2}\}[\exp\{-(x-\mu)^2/2\sigma^2\}] \tag{2}$$

Figure 5:
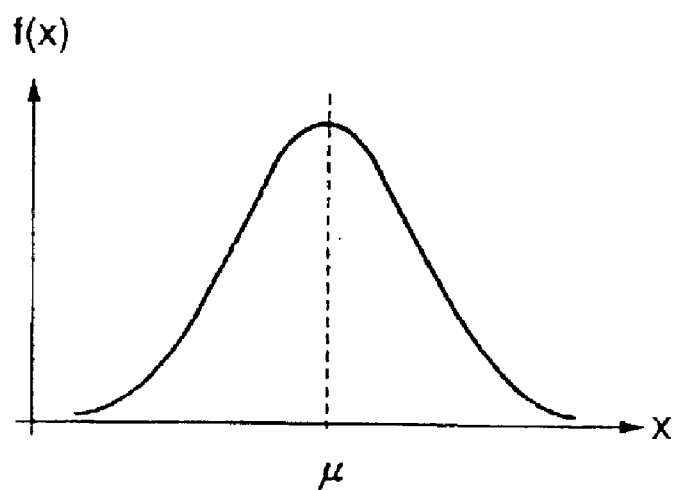
FIG. 5 is a drawing showing a Gaussian distribution function that defines levels of importance.

FIG. 5 is a drawing showing the Gaussian distribution function f(x) that defines importance.

In the equation (2), the center point of the area of importance (the fixation point of the user eye) is provided as μ (=0), and the distance from the center point is represented by x. In this manner, importance at any given point is computed as f(x) of the equation (2). Further, σ is controlled in proportion to the radius of the area of interest to adjust the size of the distribution of the distribution function f(x), thereby providing proper importance commensurate with the size of the area of importance.

Moreover, the magnitude of the greatest importance that is provided at the center of the area of importance, i.e., at the point of fixation of the user eye, is set equal to a proper value by use of the normalization factor K.

Namely, importance computed by the importance computation unit 13 based on the distance x from the center point of the area of importance is represented as:

$$f(x) = \{K/(2\pi\sigma^2)^{1/2}\}[\exp\{-x^2/2\sigma^2\}] \quad (3)$$

It should be noted that the distribution function is not limited to a Gaussian function. There are various functions having a distribution that reflects the radius of the area of importance, and any one of such functions may be used.

In the following, a description will be provided with respect to a case in which there are a plurality of areas of importance. That is, an area of importance is a point of fixation of the user eye, and such area of importance is provided at multiple locations.

Figure 6:
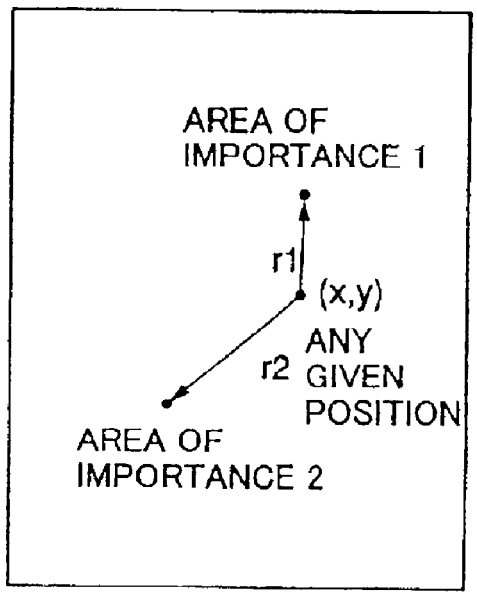
FIG. 6 is a drawing showing the way two areas of importance are specified in an image.

FIG. 6 is a drawing showing a case in which two areas of importance are provided in an image.

A first area of importance (area 1) is located at a distance r1 from the pixel of interest (x, y), and a second area of importance (area 2) is located at a distance r2 from the pixel of interest (x, y).

Figure 7:
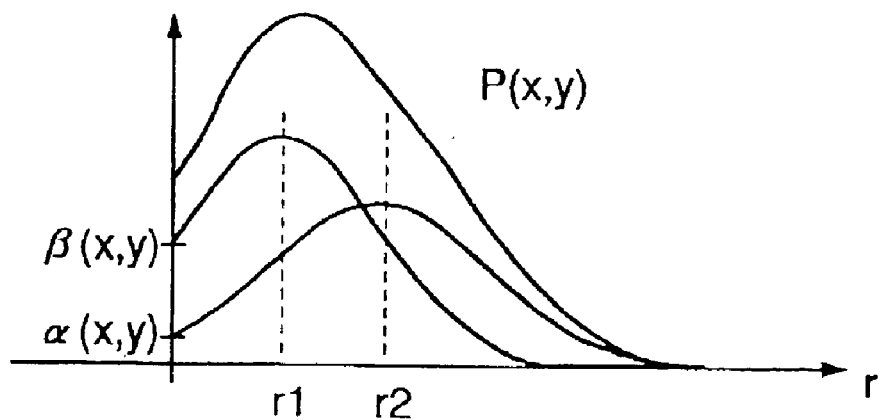
FIG. 7 shows the importance of position (x, y) in the image with respect to the first area of importance and the second area of importance.

FIG. 7 is a drawing showing the importance of the position (x, y) by representing the distance between the position (x, y) and the first area of importance and the distance between the position (x, y) and the second area of importance in the horizontal axis.

As shown in FIG. 7, the importance computation unit 13 computes the importance $\alpha(x, y)$ at the position (x, y) attributable to the second area of importance, and computes the importance $\beta(x, y)$ at the position (x, y) attributable to the first area of importance. Total importance P(x, y) at the position (x, y) is represented as a sum of the importance values attributable to all the areas of importance.

$$P(x, y) = (\alpha(x, y) + \beta(x, y))$$

The same computation applies in the case of more than two areas of importance.

In the example of the equation (3), the total importance is obtained as a sum of all the importance values. This example is not intended to be a limitation, and, for example, a product may be used in place of a sum.

In what follows, a description will be given with respect to a case in which an area of importance is defined as a small ellipse region of the image.

In such a case, two importance distribution functions orthogonal to each other and having different characteristics are employed to form a distribution function that has an ellipse-shape distribution.

Figure 8:
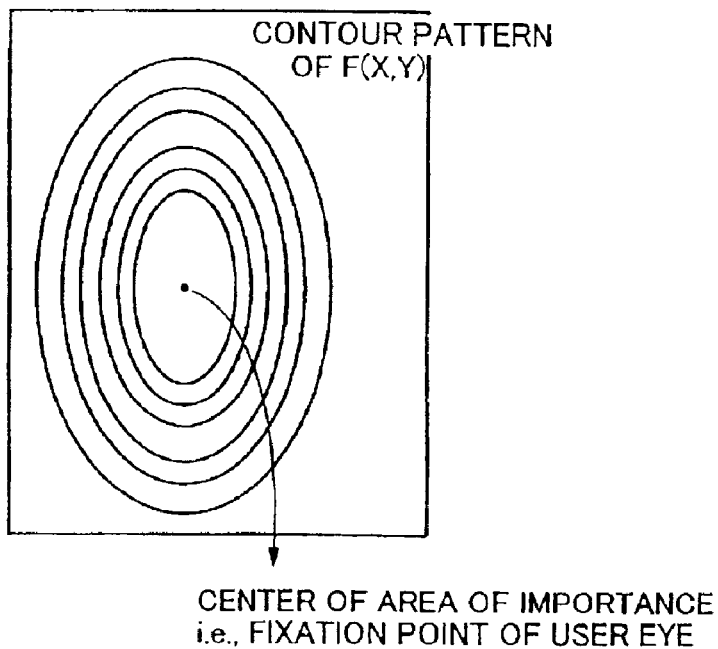
FIG. 8 is a drawing showing a contour pattern of importance in a case where the area of importance is defined as a small ellipse region of the image.

For example, two Gaussian functions fx(x) and fy(y) orthogonal to each other may be used to form a distribution function F(x, y). FIG. 8 is a drawing showing contours of importance obtained by F(x, y).

Although examples of computation of continuous importance have been given in the description provided above, importance may assume discreet values.

Figure 9:
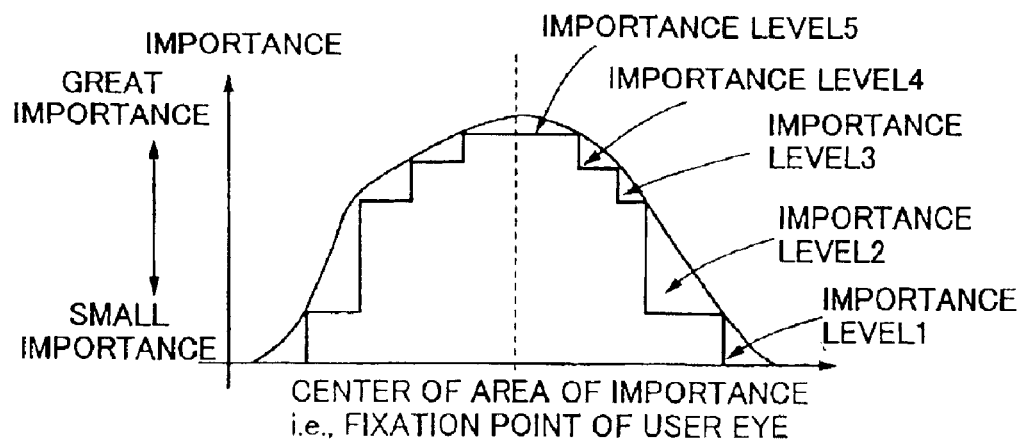
FIG. 9 is a drawing showing an example of importance that is quantized into five levels.

FIG. 9 is a drawing showing an example in which the importance level is quantized into 5 levels.

The importance defined in this manner is stored in the importance storage unit 14. In the description of embodiments provided below, quantized importance will be used.

In the following, a configuration and operation of the image processing unit 5 will be described.

Figure 10:
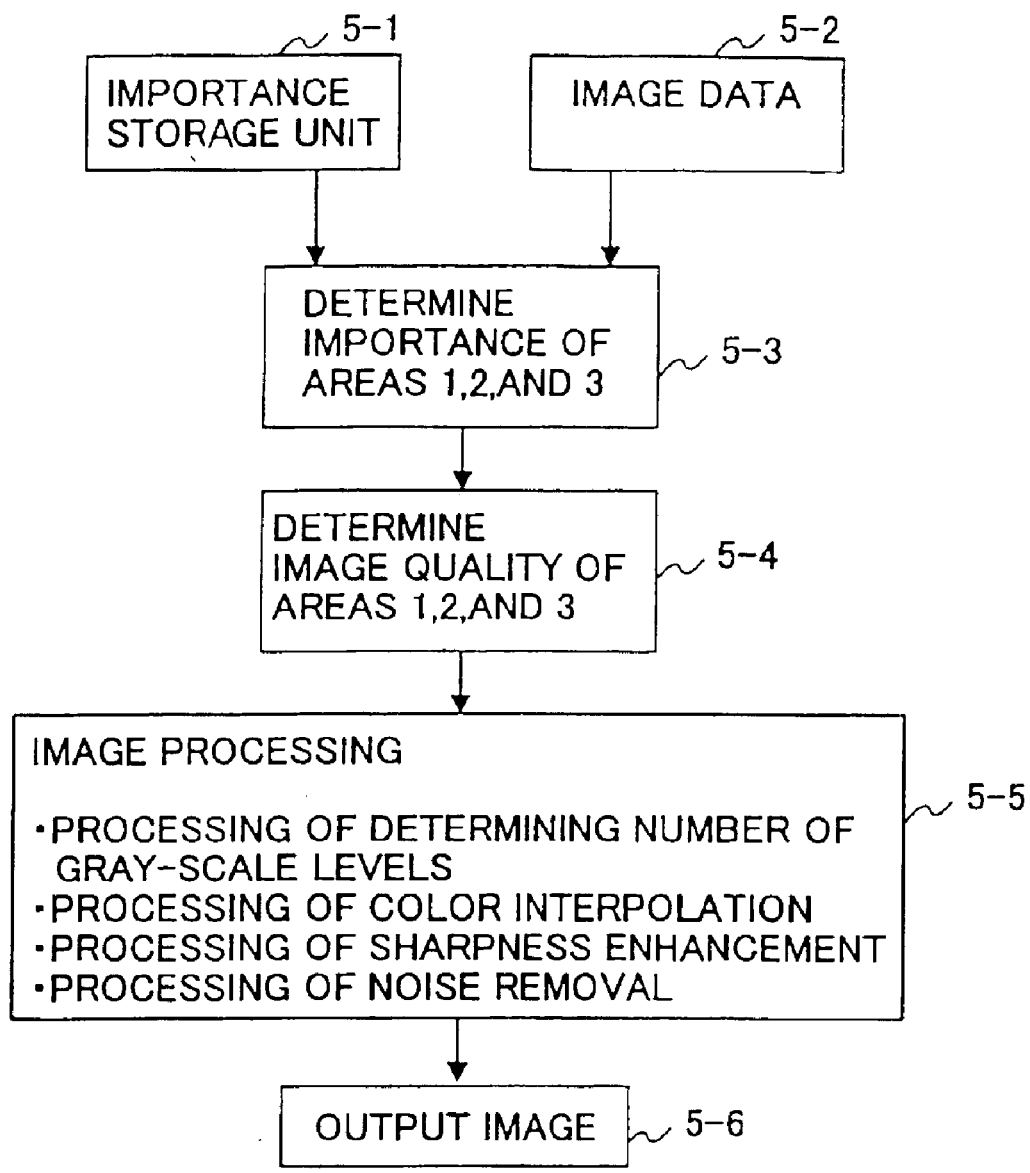
FIG. 10 is a block diagram showing a functional block configuration of an image processing unit.

FIG. 10 is a block diagram showing a functional block configuration of the image processing unit 5.

As a first step, a functional block 5-1 retrieves importance A, B, and C (A>B>C) of respective areas from the importance storage unit 14.

Figure 11:
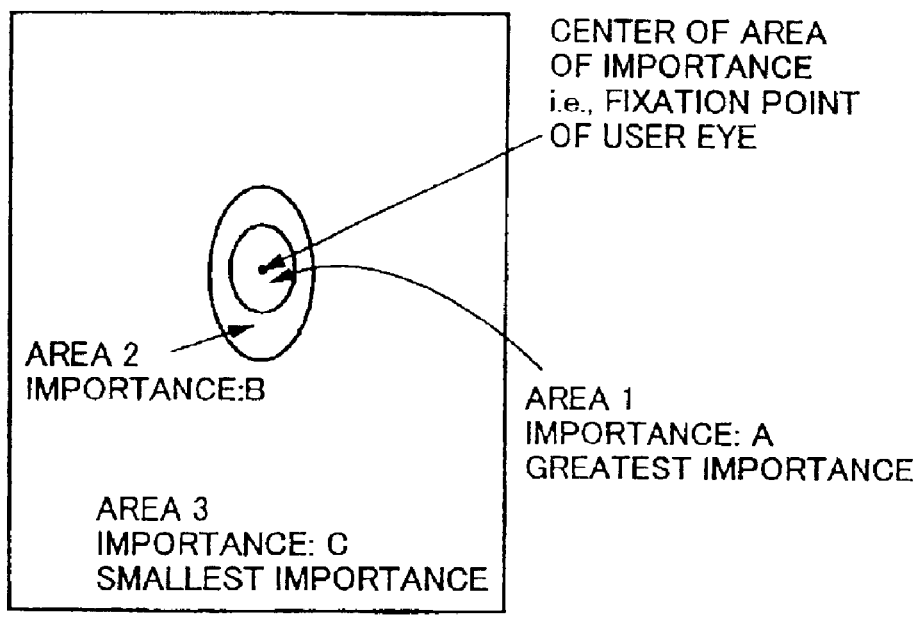
FIG. 11 is a drawing showing quantized importance levels that are assigned to respective areas of an image with reference to an example in which the area of importance is an ellipse shape.

FIG. 11 is a drawing showing quantized importance assigned to respective areas in the image in an example in which an area of importance has an ellipse shape. As shown in FIG. 11, an image area (area 1) closest to the fixation point of the user eye has importance A assigned thereto, and the importance A is the greatest importance. Further, an area (area 2) distanced from the fixation point and surrounding the area of the importance A has importance B assigned thereto. Moreover, the remaining image area (area 3) has the smallest importance C assigned thereto.

A functional block 5-2 receives image data output from the A/D conversion unit 3 shown in FIG. 1.

A functional block 5-3 matches the importance values of the respective areas retrieved from the importance storage unit 14 with the image data output from the A/D conversion unit 3, thereby allocating importance to each area of the image data. The greater the importance, the more important the area is, so that a functional block 5-4 determines image quality levels in accordance with importance of the respective areas 1 through 3.

After this, a functional block 5-5 performs image processing so as to provide image quality that is the highest for the importance A, intermediate for the importance B, and the lowest for the importance C. For example, the image data is subjected to processing for determining the number of gray scale levels, processing for color interpolation, processing for improving sharpness, processing for removing noise, etc. Each of these processing will be described later in detail in conjunction with a description of embodiments.

It should be noted that the determination of importance may be made by the unit of one block rather than by the unit of one pixel where an image is divided into a plurality of blocks.

Figure 12:
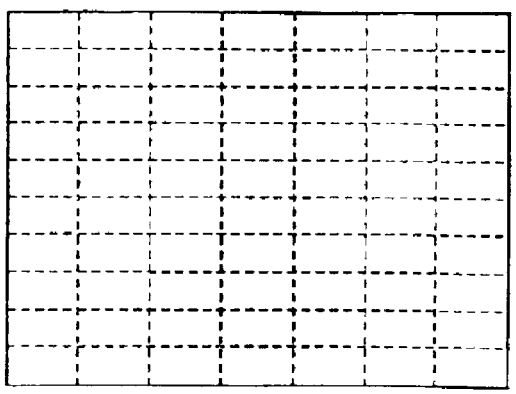
FIG. 12 is an example of blocks into which an image is divided horizontally and vertically.

FIG. 12 is an example in which an image is divided into a plurality of blocks arranged in rows and columns. In this example, the image is divided into a plurality of blocks arranged in rows and columns, and importance is determined separately with respect to each block, thereby attending to processing that provides varying image quality. In this case, processing can be simplified compared to the case in which importance is determined with respect to each pixel to attend to different processing for each pixel.

Figure 13:
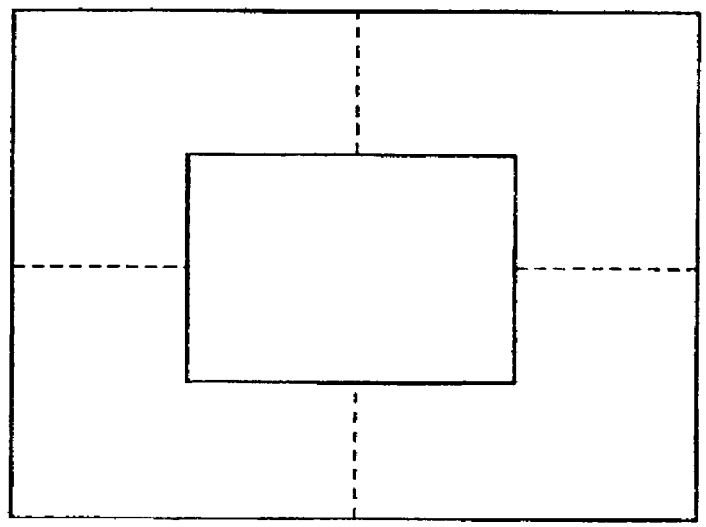
FIG. 13 is an example of blocks having different shapes into which an image is divided.

FIG. 13 is an example in which an image is divided into a plurality of blocks that are not the same size and shape. In this example, a consideration is given to the fact that an image is acquired by a digital camera, so that size of a block is changed between the center and the periphery. Division into blocks is not limited to specific configurations provided above, and a proper method of dividing an image may be employed by taking into consideration application fields and design conditions.

In the following, an embodiment of image output apparatus will be described.

Figure 14:
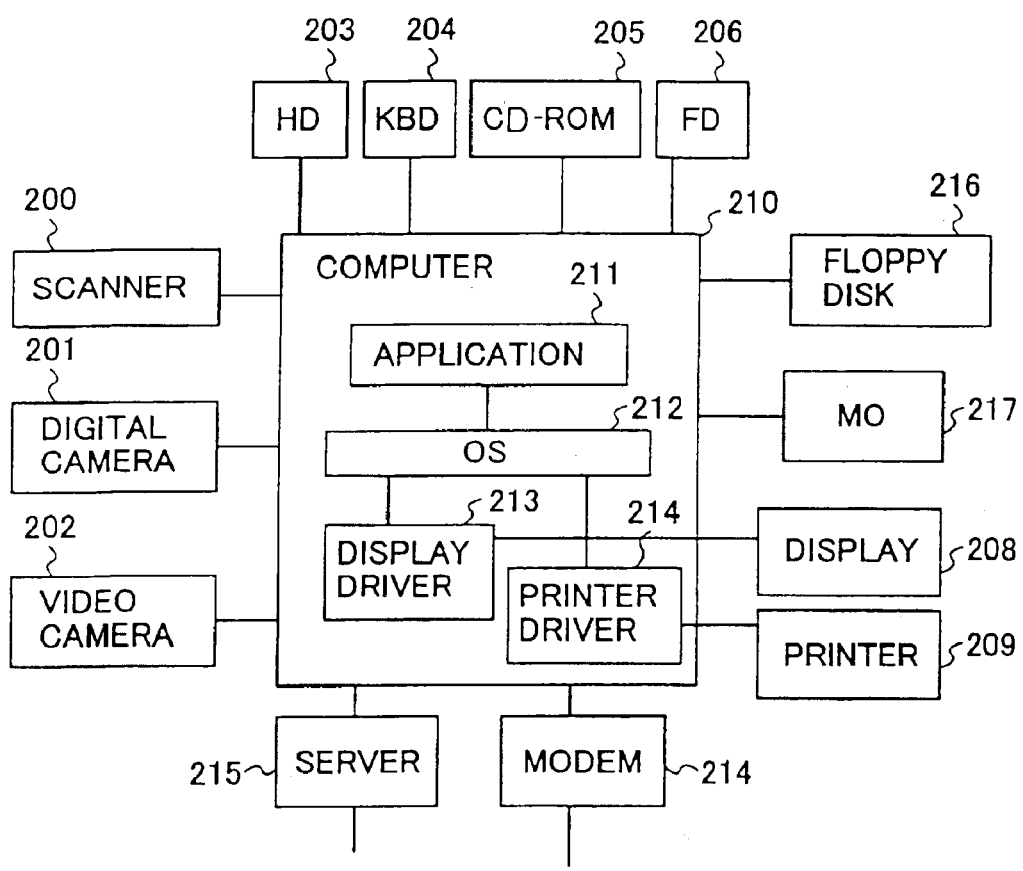
FIG. 14 is a block diagram showing an example of a hardware configuration including an image output apparatus.

FIG. 14 is a block diagram showing an example of a hardware configuration including image output apparatus.

In the system of FIG. 14, a digital camera 201 is used as an image input device. The digital camera 201 is connected to a computer system that includes a computer 210, a hard drive 203, a keyboard 204, a CD-ROM drive 205, a floppy disk drive 206, and a modem 207. The image output apparatus operates through the computer 210. An example of the image output apparatus includes a printer 209 such as an ink-jet printer, a display 208, a floppy disk 216, an MO 217, and a server 215 for storing data therein.

The modem 207 is connected to an external network via a public communication line, and can download software and data to the computer system.

An operating system 212 runs on the computer 210, which has a printer driver 214 and a display driver 213 installed therein, corresponding to the printer and the display. When using the image output apparatus, the computer 210 receives RGB image-level data, and has the image displayed on the display 208 via the display driver 213, for example. The computer 210 may have the image data stored in the server 215, or may use the printer driver 214 to convert the image data into CMY or CMYK binary data, which is then printed by the printer 209. The computer 210 may store the data in the floppy disk 216 or the MO 217 serving as a memory medium.

In the following, an embodiment of processing that makes image quality different for different levels of importance will be described in connection with the digital camera of the present invention. This processing is performed by the image processing unit 5.

Figure 15:
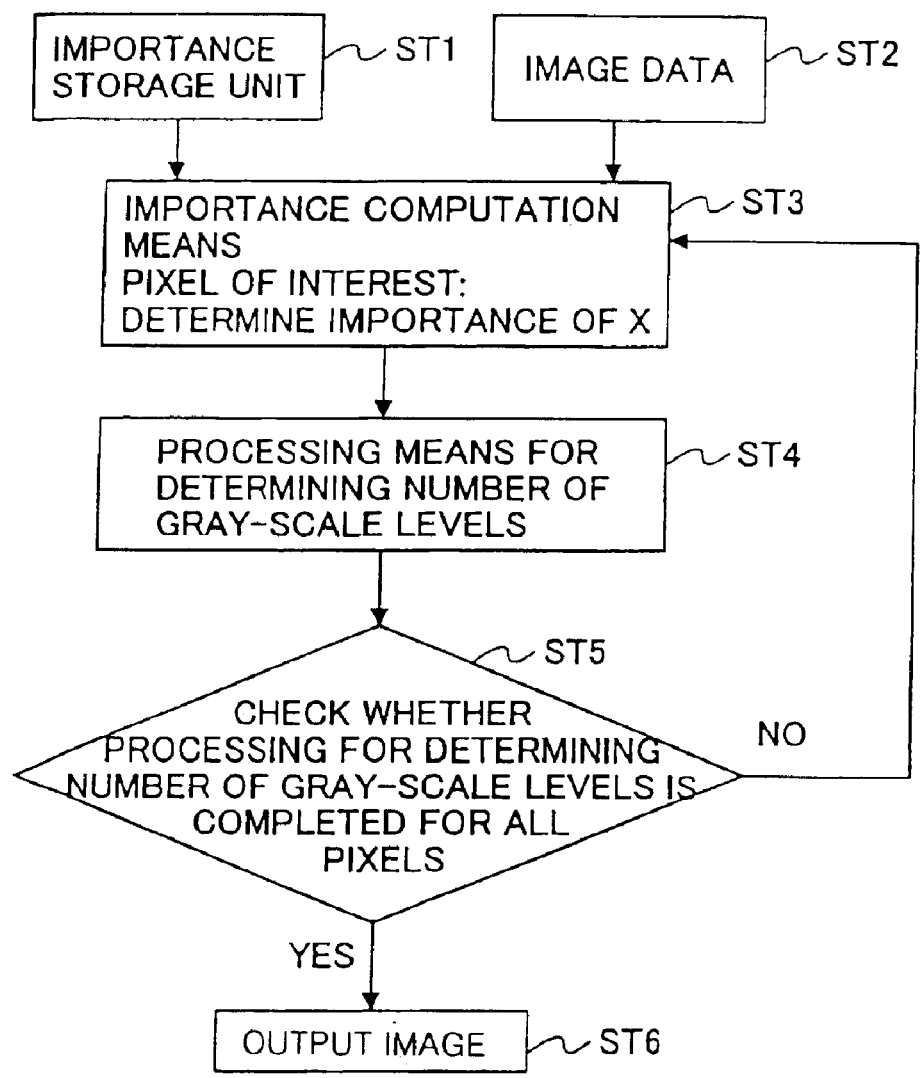
FIG. 15 is a flowchart showing a first embodiment of a process of making image quality vary depending on levels of importance.

FIG. 15 is a flowchart of a first embodiment of processing that makes image quality vary depending on levels of importance.

In the first embodiment, a nature of gray-scale representation is given a greater consideration in areas of great importance than in other areas. This makes it possible to improve image quality in the areas of great importance, and, at the same time, can reduce the required memory volume and step up the image processing speed compared with a case in which the same level of gray-scale representation is applied across the board to the entire image.

At a step ST1, importance of each area is retrieved from the importance storage unit 14. At a step ST2, image data is supplied from the A/D conversion unit 3.

At a step ST3, importance is determined by identifying an area to which the pixel X of interest belongs. At a step ST4, the means for determining the number of gray scale levels determines the number of gray scale levels. When the areas 1 through 3 have importance levels A through C (A>B>C) as in the example of FIG. 11, for example, the means for determining the number of gray scale levels changes the number of gray scale levels such as to achieve the following relation.

Number of gray scale levels for area 1
>Number of gray scale levels for area 2
>Number of gray scale levels for area 3.

Examples of the numbers of gray scale levels may be:

Number of gray scale levels for area 1=256;
Number of gray scale levels for area 2=128; and
Number of gray scale levels for area 3=64.

In the case where the digital camera is directly connected to a printer or the like to output the image, for example, the numbers of gray scale levels may be determined for respective areas in accordance with the number of output gray scale levels of the printer. If the number of gray scale levels of the printer is 128, for example, the numbers of gray scale levels may be:

Number of gray scale levels for area 1=128;
Number of gray scale levels for area 2=64; and
Number of gray scale levels for area 3=32.

The numbers of gray scale levels are typically determined in accordance with performance of the output apparatus or the like, and may vary depending on the apparatus that is actually used.

At a step ST5, a check is made as to whether the process for determining the number of gray scale levels is completed for all the pixels. If the process for determining the number of gray scale levels is not completed for all the pixels, the procedure goes back to the step ST3, and processing of a next pixel is carried out. If the process for determining the number of gray scale levels is completed for all the pixels, the procedure goes to a step ST6.

At a step ST6, the image is output. This marks the end of the procedure.

According to the first embodiment as described above, the number of gray scale levels is changed depending on the importance of respective areas. The smaller the importance of an area, the smaller the number of gray scale levels for this area is, thereby producing an image that has varying image quality for respective areas to reflect the intension of the camera user. By decreasing the number of gray scale levels with a decrease in importance, it is possible to reduce the required memory size and to achieve high-speed image processing that is to be performed at subsequent stages.

Figure 16:
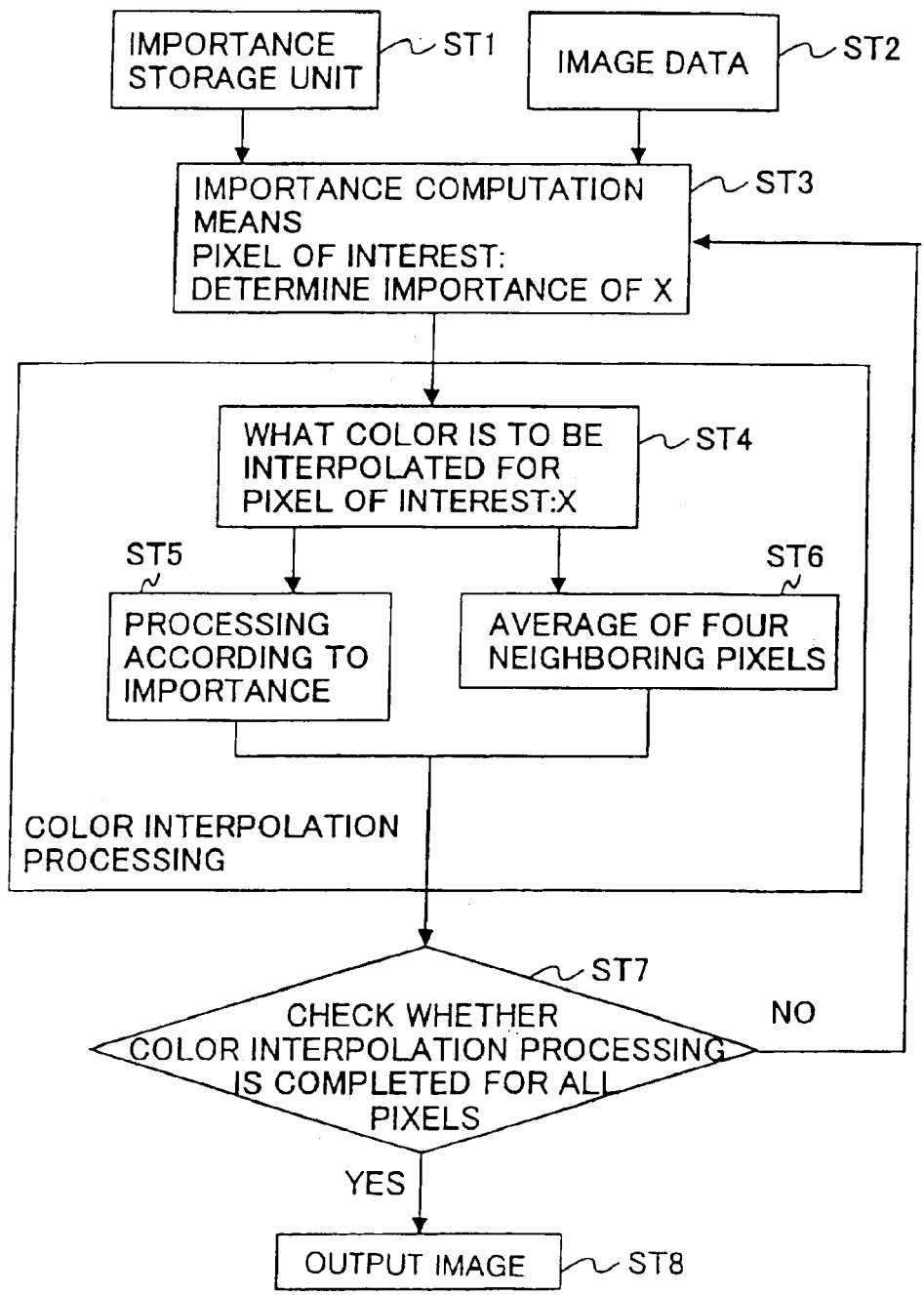
FIG. 16 is a flowchart showing a second embodiment of a process of making image quality vary depending on levels of importance.

FIG. 16 is a flowchart of a second embodiment of processing that makes image quality vary depending on levels of importance.

When a camera device is a CCD with a primary color array, a color filter as shown in FIG. 17 is used. In this case, any given pixel is provided with only one color selected from R, G, and B, so that colors of the two remaining colors need to be interpolated. A process for interpolating color information is referred to as color interpolation processing.

As can be seen from FIG. 17, the density of G pixels is twice as great as the density of R pixels or the density of B pixels in the primary color array. This is because human visual perception of luminance is relatively greater for the G component. Interpolation of the G color is thus performed more rigidly than interpolation of the two other colors.

In this embodiment, color interpolation processing is given a greater consideration in areas of great importance than in other areas. This makes it possible to improve image quality in the areas of great importance, and, at the same time, can step up the color-interpolation processing speed compared with a case in which the same image processing is applied across the board to the entire image.

In FIG. 18, a pixel X located at the center of the figure is the pixel of interest. Analysis will be given below in respect of a case in which the G-color information of the pixel X is interpolated. The four neighboring pixels of the pixel X are referred to as pixels a, b, c, and d, which have G values that are already known. The G value of the pixel X is to be computed based on the G values of the pixels a, b, c, and d.

An absolute value of a difference between the pixel b and the pixel c is denoted as $\Delta x$, and an absolute value of a difference between the pixel a and the pixel d is denoted as $\Delta y$. $\Delta x$ and $\Delta y$ are compared with each other to check whether the green color at the pixel X has a directionality either in the horizontal direction or in the vertical direction. Interpolation is applied in the direction that has a less color change.

Namely, when either $\Delta x$ or $\Delta y$ is greater than a threshold value th, an average of the two pixels is computed in respect of the smaller of the $\Delta x$ and $\Delta y$, thereby attending to interpolation. Otherwise, it is ascertained that there is no directionality either in the horizontal direction or in the vertical direction, and an average of the four pixels a, b, c, and d is obtained. Namely, $$\Delta x = |b-c|$$

$$\Delta y = |a-d| \tag{4}$$

and $$X = (b+c)/2 \text{ if } (\Delta x < \Delta y \text{ and } \Delta y \geq th)$$

$$(a+d)/2 \text{ if } (\Delta x > \Delta y \text{ and } \Delta x \geq th) \tag{5}$$

$$(a+d+b+c)/4 \text{ other} \tag{6}$$

This is the color interpolation processing of the areas of great importance.

In areas other than the areas of great importance, simple averaging computation based on the equation (6) may be employed. Further, the simple averaging of neighboring pixels is computed in the case of X being R or B. In this manner, it is possible to attend to color interpolation processing according to importance levels, i.e., to place a greater emphasis on the areas of great importance than on other areas in terms of color interpolation processing.

With reference to FIG. 16, at a step ST1, importance of each area is retrieved from the importance storage unit 14. At a step ST2, image data is supplied from the A/D conversion unit 3.

At a step ST3, importance is determined by identifying an area to which the pixel X of interest belongs.

At a step ST4, a color to be interpolated for the pixel X of interest is determined. If the color to be interpolated is the G color, the procedure goes to a step ST5. If the color to be interpolated is R or G, the procedure goes to a step ST6.

At the step ST5, the color interpolation processing as described above is carried out in accordance with the importance of the area. At the step ST6, a simple average of the four neighboring pixels is obtained.

At a step ST7, a check is made as to whether the color interpolation processing is completed for all the pixels. If the color interpolation processing is not completed for all the pixels, the procedure goes back to the step ST3, and processing of a next pixel is carried out. If the color interpolation processing is completed for all the pixels, the procedure goes to a step ST8.

At the step ST8, the image is output. This marks the end of the procedure.

According to the second embodiment as described above, the color interpolation processing is changed depending on the importance of respective areas, thereby producing an image that has varying image quality for respective areas to reflect the intension of the camera user. By simplifying the color interpolation processing in the areas of less importance, it is possible to achieve high-speed color interpolation processing.

Further, as a variation of the second embodiment, the color interpolation processing may be changed in accordance with importance by changing a range of an interpolation reference area in accordance of importance of respective areas.

For example, a relatively wide area of interpolation reference is used in an area of relatively great importance, and a relatively narrow area of interpolation reference is used in an area of relatively small importance. A color value of the pixel of interest can be determined from all the color information contained in the assigned area of interpolation reference.

Figures 19, 20:
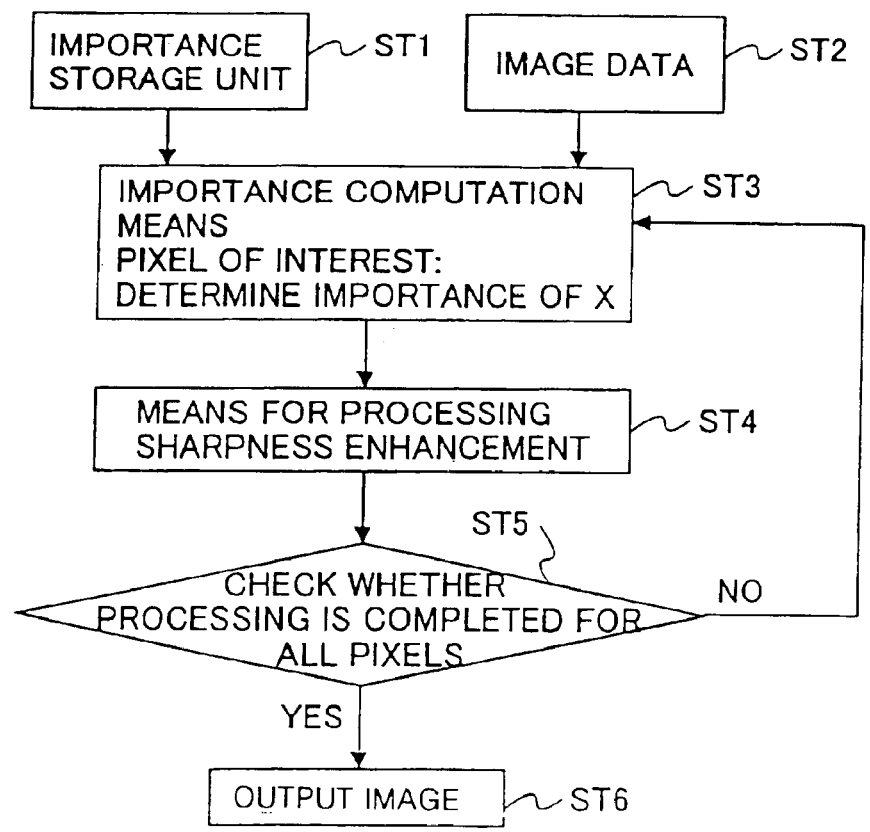
FIG. 19 is a drawing showing an example of a wide area of interpolation reference that corresponds to the case of great importance.
FIG. 20 is a flowchart showing a third embodiment of a process of making image quality vary depending on levels of importance.

FIG. 19 is a drawing showing an example of a relatively wide area of interpolation reference that is employed in the case of relatively great importance.

A method of interpolation will be described with respect to the area of interpolation reference shown in FIG. 19. Twelve neighboring pixels of the pixel X of interest are denoted as a, b, c, d, e, f, g, h, i, j, k, and l, all of which are used to interpolate the G information of the pixel X of interest. The twelve neighboring pixels have G values that are already known.

Further, a check is made as to whether the pixel of interest has a directionality either in the horizontal direction or the vertical direction. Namely, the color interpolation processing is performed by computing $$\Delta x = |(i+b+j)-(l+c+k)|$$

$$\Delta y = |(e+a+h)-(f+d+g)| \quad (7)$$

and $$X = (i+b+j+l+c+k)/6$$

if ($\Delta x < \Delta y$ and $\Delta y \geq th$)

$$(e+a+h+f+d+g)/6$$

if ($\Delta x > \Delta y$ and $\Delta x \geq th$) \quad (8)

$$(a+d+b+c)/4 \text{ other} \quad (9)$$

In areas of relatively small importance, a simple average of four pixels a, b, c, and d may be obtained based on the equation (9). In this case, the area of interpolation reference is the same as the area shown in FIG. 18, which is narrower than the area of interpolation reference shown in FIG. 19.

In the variation of the second embodiment, a relatively wide area of interpolation reference is used in an area of relatively great importance, and a relatively narrow area of interpolation reference is used in an area of relatively small importance, so that the color interpolation processing is changed depending on the importance of respective areas, thereby producing an image that has varying image quality for respective areas to reflect the intension of the camera user. By simplifying the color interpolation processing in the areas of less importance, it is possible to achieve high-speed color interpolation processing.

FIG. 20 is a flowchart of a third embodiment of processing that makes image quality vary depending on levels of importance.

In the third embodiment, processing for improving image sharpness is changed according to the importance levels of respective image areas. The processing for improving sharpness is also called an aperture correction, which enhances edge portions of the image. In order to enhance edge portions, a check needs to be made first as to whether the pixel of interest is part of an edge portion. Such a check is made by using G signals based on the assumption that G values are good representative of luminance levels.

In this embodiment, the check for determining whether the pixel of interest is part of an edge portion and the processing for improving sharpness are performed more diligently in areas of great importance than in other areas. This makes it possible to improve image quality in the areas of great importance, and, at the same time, can step up the processing speed compared with a case in which the same image processing is applied across the board to the entire image.

Figure 21:
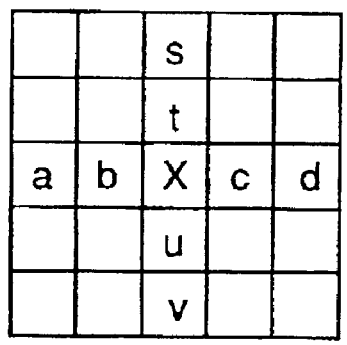
FIG. 21 is a drawing showing the pixel of interest and neighboring pixels for the purpose of sharpness enhancement processing.

As shown in FIG. 21, the pixel value of the pixel of interest is denoted as X in the area of great importance. With respect to the pixel X, four neighboring pixels in the horizontal direction have pixel values a, b, c, and d, and four neighboring pixels in the vertical direction have pixel values s, t, u, and v. In order to detect edges, high-range Laplacian operation and middle-range Laplacian operation are performed in respect of the horizontal direction as well as the vertical direction, for example.

High-range Laplacian in Horizontal Direction:

$$Lhh = 2X - b - c$$

Middle-range Laplacian in Horizontal Direction:

$$Lhm = 2X - a - d$$

High-range Laplacian in Vertical Direction:

$$Lvh=2X-t-u$$

Middle-range Laplacian in Vertical Direction:

$$Lvm=2X-s-v \quad (10)$$

In the equation (10), values of two neighboring pixels positioned above and below the pixel of interest or positioned to the left and to the right of the pixel of interest are subtracted from twice the pixel value of the pixel of interest. Namely, when the value of the pixel of interest is different from the values of the neighboring pixels, the computed value is relatively large. On the other hand, when the value of the pixel of interest is comparable to the values of the neighboring pixels, the computed value is relatively small. Laplacian operation as described above can detect the degree to which the pixel of interest has an isolated pixel value.

Figure 22:
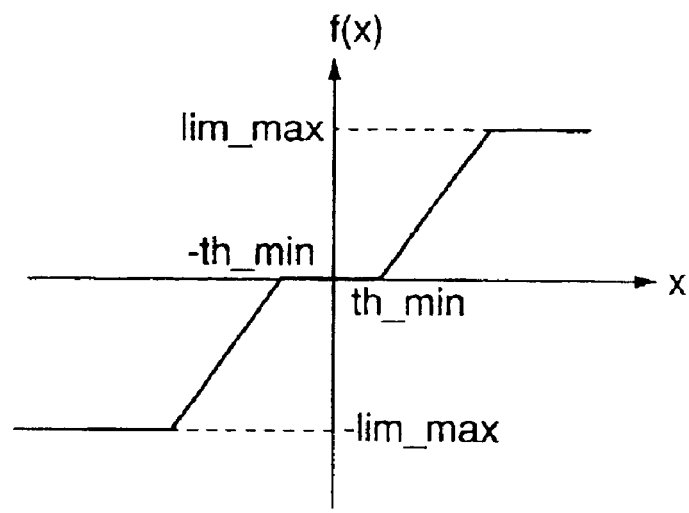
FIG. 22 is a drawing showing a non-linear transformation applied to Laplacian operation.

Further, Lhh, Lhm, Lvh, and Lvm are subjected to non-linear transformation f(x) as shown in FIG. 22. This puts a lower limit th_min and an upper limit th_max to the results of Laplacian operation. In this limiting process, if the value of the Laplacian operation is smaller than th_min, the value is set equal to zero, thereby treating the pixel of interest as being not part of an edge portion.

Further, a comparison is made between (f(Lhh)+f(Lhm)) and (f(Lvh)+f(Lvm)) to check whether the pixel X is part of a horizontal line or a vertical line. If (f(Lhh)+f(Lhm))>(f(Lvh)+f(Lvm)), the pixel of interest is regarded as part of a vertical line. If (f(Lhh)+f(Lhm))<(f(Lvh)+f(Lvm)), the pixel of interest is regarded as part of a horizontal line.

If the pixel of interest is regarded as part of a horizontal line, the R value Xr, the B value Xb, and the G value Xg of the pixel X are multiplied by correction factors for improving the sharpness of horizontal lines. In detail, a R value Xr', a B value Xb', and a G value Xg' of the pixel X after the correction are computed as follows.

$$Xr'=Xr((f(Lhh)+f(Lhm))/2+Z)/Z$$

$$Xg'=Xg((f(Lhh)+f(Lhm))/2+Z)/Z$$

$$Xb'=Xb((f(Lhh)+f(Lhm))/2+Z)/Z \quad (11)$$

It should be noted that the greater the possibility of the pixel of interest being part of a horizontal line, the larger the value of $|f(Lhh)+f(Lhm)|$. According to the equation (11), therefore, the greater the possibility of the pixel of interest being part of a horizontal line, the more enhanced the pixel of interest. According to experiments conducted by the inventor, Z is preferably close to 128.

Processing for a vertical line is performed in the similar manner. Namely, if the pixel of interest is regarded as part of a vertical line, the R value Xr, the B value Xb, and the G value Xg of the pixel X are multiplied by correction factors for improving the sharpness of vertical lines. In detail, a R value Xr', a B value Xb', and a G value Xg' of the pixel X after the correction are computed as follows.

$$Xr'=Xr((f(Lvh)+f(Lvm))/2+Z)/Z$$

$$Xg'=Xg((f(Lvh)+f(Lvm))/2+Z)/Z$$

$$Xb'=Xb((f(Lvh)+f(Lvm))/2+Z)/Z \quad (12)$$

According to the equation (12), the greater the possibility of the pixel of interest being part of a vertical line, the more enhanced the pixel of interest. According to experiments conducted by the inventor, Z is preferably close to 128.

The color interpolation processing for the areas of great importance is described above.

In areas other than the areas of great importance, only either one of the high-range Laplacian operation and the middle-range Laplacian operation may be computed to check the horizontal and vertical components of the pixel of interest. In this manner, it is possible to conduct sharpness enhancement in accordance with the levels of importance, i.e., to place a greater emphasis on the areas of great importance than on other areas in terms of sharpness enhancement.

With reference to FIG. 20, the processing described above will be summarized. At a step ST1, importance of each area is retrieved from the importance storage unit 14. At a step ST2, image data is supplied from the A/D conversion unit 3.

At a step ST3, importance is determined by identifying an area to which the pixel X of interest belongs.

At a step ST4, a check is made in accordance with the importance of the pixel X of interest as to whether the pixel of interest is part of an edge portion, and the processing for improving sharpness is performed according to the levels of importance.

At a step ST5, a check is made as to whether the sharpness enhancement processing is completed for all the pixels. If the sharpness enhancement processing is not completed for all the pixels, the procedure goes back to the step ST3, and processing of a next pixel is carried out. If the sharpness enhancement processing is completed for all the pixels, the procedure goes to a step ST6.

At the step ST6, the image is output. This marks the end of the procedure.

According to the third embodiment as described above, the sharpness enhancement processing is changed depending on the importance of respective areas, thereby producing an image that has varying image quality for respective areas to reflect the intension of the camera user. By simplifying the sharpness enhancement processing in the areas of less importance, it is possible to achieve high-speed sharpness enhancement processing.

Figure 23:
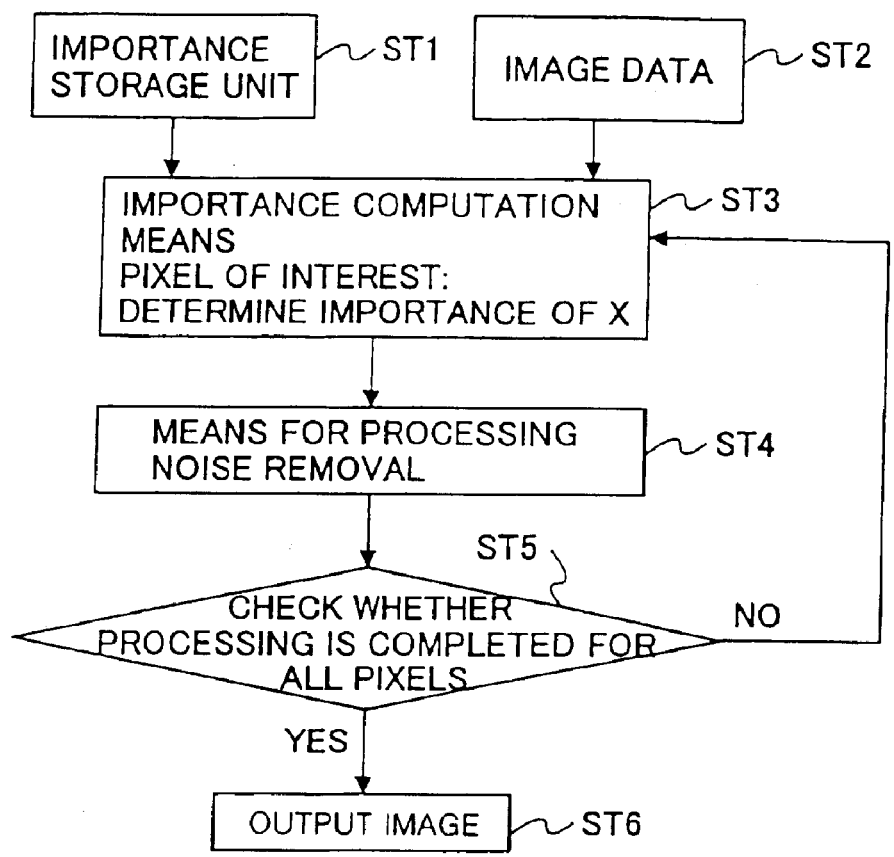
FIG. 23 is a flowchart showing a fourth embodiment of a process of making image quality vary depending on levels of importance.

FIG. 23 is a flowchart of a fourth embodiment of processing that makes image quality vary depending on levels of importance.

Digital cameras use an electrical shutter, so that obtained images may sustain noise. In order to remove the noise, output signals of the CCD are subjected to optical low-pass filtering, which is incomplete, however, in that all the noise is not removed. Further, color interpolation processing and sharpness enhancement processing may end up emphasizing the noise, in which case the processing of noise removal is absolutely necessary.

Noises that are generated by color interpolation processing appear near boundaries between the black and the white. It is more likely to have erroneous colors in monochrome areas when R and/or B components having sparse density are interpolated than when G components having greater density are interpolated. Such noise is referred to as a pseudo color.

In this embodiment, a process of determining whether the pixel of interest sustains a pseudo color is given a greater consideration in areas of great importance than in other areas. This makes it possible to improve image quality in the areas of great importance, and, at the same time, can step up the processing speed compared with a case in which the same image processing is applied across the board to the entire image.

As a first step, a check is made as to whether the pixel of interest is a noise. In order to extract the noise of R and B components, a RB component of the pixel X of interest is computed. With the R value Xr and B value Xb of the pixel X, the RB component of the pixel X is computed as:

$$\Delta X\_RB = |Xr - Xb| \quad (13)$$

Then, the four neighboring pixels around the pixel of interest are denoted a, b, c, and d as shown in FIG. 18, and a weighted average ΔE is obtained as follows.

$$\Delta E = 8 \times \Delta x\_RB - 2 \times (\Delta a\_RB + \Delta b\_RB + \Delta c\_RB + \Delta d\_RB) \quad (14)$$

ΔE is compared with a threshold value th__e. If ΔE is greater than the threshold value th__e, it is ascertained that the pixel of interest is a noise. If the pixel of interest is a noise, noise removal is performed. In detail, a R value Xr' and a B value Xb' of the pixel X after the correction are computed as follows.

$$Xr'=(ar+br+cr+dr)/4 \text{ if } (\Delta E \geq th\_e)$$

$$Xr'=Xr' \text{ other}$$

$$Xb'=(ab+bb+cb+db)/4 \text{ if } (\Delta E \geq th\_e)$$

$$Xb'=Xb' \text{ other} \quad (15)$$

where ar, br, cr, and dr are R components of the pixels a, b, c, and d, respectively, and ab, bb, cb, and db are B components of the pixels a, b, c, and d, respectively. This is the color interpolation processing for areas of great importance.

In areas other than the areas of great importance, the weighted average ΔE is obtained by using two neighboring pixels located on one side of the pixel of interest rather than using all the four neighboring pixels. Namely, it may be obtained as:

$$\Delta E = 4 \times \Delta X\_RB - 2 \times (\Delta a\_RB + \Delta b\_RB) \quad (16)$$

In this case, the noise removal is also simplified by using only the two neighboring pixels provided on one side of the pixel of interest. For example, $$Xr'=(ar+br)/2 \text{ if } (\Delta E \geq th\_e)$$

$$Xr'=Xr' \text{ other}$$

$$Xb'=(ab+bb)/2 \text{ if } (\Delta E \geq th\_e)$$

$$Xb'=Xb' \text{ other} \quad (17)$$

With reference to FIG. 23, the processing described above will be summarized. At a step ST1, importance of each area is retrieved from the importance storage unit 14. At a step ST2, image data is supplied from the A/D conversion unit 3.

At a step ST3, importance is determined by identifying an area to which the pixel X of interest belongs.

At a step ST4, a check is made in accordance with the importance of the pixel X of interest as to whether the pixel of interest is a noise, and the processing of noise removal is performed according to the levels of importance.

At a step ST5, a check is made as to whether the noise removal processing is completed for all the pixels. If the noise removal processing is not completed for all the pixels, the procedure goes back to the step ST3, and processing of a next pixel is carried out. If the noise removal processing is completed for all the pixels, the procedure goes to a step ST6.

At the step ST6, the image is output. This marks the end of the procedure.

According to the fourth embodiment as described above, the noise removal processing is changed depending on the importance of respective areas, thereby producing an image that has varying image quality for respective areas to reflect the intension of the camera user. By simplifying the noise removal processing in the areas of less importance, it is possible to achieve high-speed noise removal processing.

The noise removal processing is not limited to the example of the above embodiment. For example, a check can be made as to whether the pixel of interest is a noise by checking whether the RGB values of the pixel of interest fall within a predetermined range around the RGB averages of the reference area. Namely, two positive threshold values may be provided as an upper limit and a lower limit of the predetermined range, and the target pixel is recognized as being not a noise if the following inequality is satisfied.

Threshold 1<(Value of Pixel of Interest/Average of Reference Area)<Threshold 2

If the pixel of interest is regarded as a noise because the above inequality is not satisfied, noise may be removed by replacing the value of the pixel of interest with the average value of the reference area, for example. In this case, the area of reference may be provided around the center of the pixel of interest for areas of great importance, and a large area of reference may be provided around the center of the pixel of interest for areas of less importance.

For areas of great importance, a check as to whether the pixel of importance is a noise may be made with respect to all the RGB signals, and, for areas of less importance, the check may be made with respect to only the G signal to which human vision is most sensitive. This simplifies the processing.

The first through fourth embodiments have been described above. In these embodiments, a predetermined amount of time for the purpose of noise removal may be set aside in advance separately with respect to each of the areas 1, 2, and 3 having the respective levels of importance as shown in FIG. 11, for example, and the area of reference and the processing steps may be determined in such a manner as to insure that the noise removal will be completed within the predetermined amount of time that have been set aside. In this manner, it is possible to maintain high image quality in the areas of importance perceived by the camera user even though the same amount of processing time is spent as when the universal processing is applied across the board to the entirety of the image.

Further, the processing of determining the number of gray scale levels, the color interpolation processing, the sharpness enhancement processing, and the noise removal processing that have been described in the first through fourth embodiments are not limited to the specific examples of these embodiments. As long as being applicable to image data that the present invention employs, any technology used in the art of digital image processing or in the relevant art of image processing may be used with the present invention to achieve efficient image processing based on the position of the fixation point of the user eye.

Although the present invention has been described with reference to specific embodiments, the present invention is not limited to these embodiments, but various variations and modifications may be made without departing from the scope of the invention set forth in the claims attached hereto.

[Advantages of the Invention]

In the present invention, the number of gray scale levels is changed according to the levels of importance corresponding to the respective areas of the image, and is decreased in the areas of small importance, thereby producing an image having varying image quality for respective areas to reflect the intension of the camera user. By decreasing the number of gray scale levels in the areas of small importance, it is possible to reduce the memory size and to step up the processing speed of image processing that is to be performed at later stages.

In the present invention, further, the color interpolation processing of changing color interpolation processing for the respective areas of the image, the sharpness enhancement processing of changing sharpness enhancement processing for the respective areas of the image, and/or the noise removal processing of changing noise removal processing for the respective areas of image are performed according to the determinations by the importance computation unit. In this manner, the color interpolation processing, the sharpness enhancement processing, and/or the noise removal processing are changed in accordance with the levels of importance of the respective image areas, thereby producing an image having varying image quality for respective areas to reflect the intension of the camera user. By simplifying the processing in the areas of small importance, it is possible to achieve high-speed processing.

In this manner, processing that places an emphasis on areas of great importance is performed to reflect the intension of the camera user, thereby providing a digital still camera that can improve image quality in a short processing time.

What is claimed is:

1. A camera apparatus, comprising:
a camera unit configured to acquire an image;
a line-of-sight detection unit configured to detect a point of eye fixation of a user within a camera screen;
an importance computation unit configured to determine levels of importance for respective areas of the image acquired by said camera unit in accordance with the detection by said line-of-sight detection unit; and
a number-of-gray-scale-level determining unit configured to allocate area-dependent numbers of gray scale levels to the respective areas of the image in response to the determination by the importance computation unit, thereby reducing a processing time required for processing less important areas of the image to reduce a total processing time required for processing an entirety of the image prior to storage of the image in memory,
wherein said number-of gray-scale-level determining unit increases the number of gray scale levels in a first area compared with a second area that has a smaller level of importance than the first area.

2. A camera apparatus, comprising:
a camera unit configured to acquire an image;
a line-of-sight detection unit configured to detect a point of eye fixation of a user within a camera screen;
an importance computation unit configured to determine levels of importance for respective areas of the image acquired by said camera unit in accordance with the detection by said line-of-sight detection unit; and
a color interpolation processing unit configured to change color interpolation processing for the respective areas of the image in response to the determination by the importance computation unit,
wherein said color interpolation processing unit performs a first processing in a first area, and performs a second processing in a second area that has a smaller level of importance than the first area, the first processing generating an image having higher quality than the second processing, and the second processing being faster than this first processing.

3. A camera apparatus, comprising:
a camera unit configured to acquire an image;
a line-of-sight detection unit configured to detect a point of eye fixation of a user within a camera screen;
an importance computation unit configured to determine levels of importance for respective areas of the image acquired by said camera unit in accordance with the detection by said line-of-sight detection unit; and
a sharpness enhancement processing unit configured to apply area-dependent sharpness enhancement processing to the respective areas of the image in response to the determination by the importance computation unit, thereby reducing a processing time required for processing less important areas of the image to reduce a total processing time required for processing an entirety of the image prior to storage of the image in memory,
wherein the sharpness processing unit performs a first processing in a first area, and performs a second processing in a second area that has a smaller level of importance than the first area, the first processing generating an image having higher quality than the second processing, and the second processing being faster than the first processing.

4. A camera apparatus, comprising:
a camera unit configured to acquire an image;
a line-of-sight detection unit configured to detect a point of eye fixation of a user within a camera screen;
an importance computation unit configured to determine levels of importance for respective areas of the image acquired by said camera unit in accordance with the detection by said line-of-sight detection unit; and
a noise removal processing unit configured to change noise removal processing for the respective areas of the image in response to the determination by the importance computation unit,
wherein said noise removal processing unit performs a first processing in a first area, and performs a second processing in a second area that has a smaller level of importance than the first area, the first processing generating an image having higher quality than the second processing, and the second processing being faster than the first processing.

5. A method of acquiring an image, comprising the steps of:
acquiring an image;
detecting a point of eye fixation of a user within a camera screen;
determining levels of importance for respective areas of the acquired image in accordance with the detection of the point of eye fixation; and
assigning area-dependent numbers of gray scale levels to the respective areas of the image in response to the determined levels of importance, thereby reducing a processing time required for processing less important areas of the image to reduce a total processing time required for processing an entirety of the image prior to storage of the image in memory,
wherein assigning area-dependent numbers of gray scale levels increases the number of gray scale levels in a first area compared with a second area that has a smaller level of importance than the first area.

6. A method of acquiring an image, comprising the steps of:

acquiring an image;

detecting a point of eye fixation of a user within a camera screen; determining levels of importance for respective areas of the acquired image in accordance with the detection of the point of eye fixation; and applying area-dependent color interpolation processing to the respective areas of the image in response to the determined levels of importance, thereby reducing a processing time required for processing less important areas of the image to reduce a total processing time required for processing an entirety of the image prior to storage of the image in memory, wherein applying area-dependent color interpolation processing performs first processing in a first area, and performs second processing in a second area that has a smaller level of importance than the first area, the first processing generating an image having higher quality than the second processing, and the second processing being faster than this first processing.

7. A method of acquiring an image, comprising the steps of:

acquiring an image;

detecting a point of eye fixation of a user within a camera screen;

determining levels of importance for respective areas of the acquired image in accordance with the detection of the point of eye fixation; and applying area-dependent sharpness enhancement processing to the respective areas of the image in response to the determined levels of importance, thereby reducing a processing time required for processing less important areas of the image to reduce a total processing time required for processing an entirety of the image prior to storage of the image in memory, wherein applying area-dependent sharpness enhancement processing performs first processing in a first area, and performs second processing in a second area that has a smaller level of importance than the first area, the first processing generating an image having higher quality than the second processing, and the second processing being faster than the first processing.

8. A method of acquiring an image, comprising the steps of:

acquiring an image;

detecting a point of eye fixation of a user within a camera screen;

determining levels of importance for respective areas of the acquired image in accordance with the detection of the point of eye fixation; and applying area-dependent noise removal processing to the respective areas of the image in response to the determined levels of importance, thereby reducing a processing time required for processing less important areas of the image to reduce a total processing time required for processing an entirety of the image prior to storage of the image in memory, wherein applying area-dependent noise removal processing performs first processing in a first area, and performs second processing in a second area that has a smaller level of importance than the first area, the first processing generating an image having higher quality than the second processing, and the second processing being faster than the first processing.

9. A camera apparatus, comprising:

a camera unit configured to acquire an image;

a line-of-sight detection unit configured to detect a point of eye fixation of a user within a camera screen;

an importance computation unit configured to determine levels of importance for respective areas of the image acquired by said camera unit in accordance with the detection by said line-of-sight detection unit; and a number-of-gray-scale-level determining unit configured to change a number of gray scale levels for the respective areas of the image in response to the determination by the importance computation unit, thereby simplifying processing for less important areas of the image compared to more important areas of the image based on comparison of the levels of importance of the less important areas of the image with the levels of importance of the more important areas of the image, wherein said number-of-gray-scale-level determining unit increases the number of gray scale levels in a first area compared with a second area that has a smaller level of importance than the first area.

10. A camera device, comprising:

a camera unit configured to acquire an image;

a line-of-sight detection unit configured to detect a point of eye fixation of a user within a camera screen;

an importance computation unit configured to determine levels of importance for respective areas of the image acquired by said camera unit in accordance with the detection by said line-of-sight detection unit; and a color interpolation processing unit configured to change color interpolation processing for the respective areas of the image in response to the determination by the importance computation unit, thereby simplifying processing for less important areas of the image compared to more important areas of the image based on comparison of the levels of importance of the less important areas of the image with the levels of importance of the more important areas of the image, wherein said color interpolation processing unit performs first processing in a first area, and performs second processing in a second area that has a smaller level of importance than the first area, the first processing generating an image having higher quality than the second processing, and the second processing being faster than the first processing.

11. A camera device, comprising:

a camera unit configured to acquire an image;

a line-of-sight detection unit configured to detect a point of eye fixation of a user within a camera screen;

an importance computation unit configured to determine levels of importance for respective areas of the image acquired by said camera unit in accordance with the detection by said line-of-sight detection unit; and a sharpness enhancement processing unit configured to change sharpness enhancement processing for the respective areas of the image in response to the determination by the importance computation unit, thereby simplifying processing for less important areas of the image compared to more important areas of the image based on comparison of the levels of importance of the less important areas of the image with the levels of importance of the more important areas of the image, wherein the sharpness processing unit performs first processing in a first area, and performs second processing in a second area that has a smaller level of importance than the first area, the first processing generating an image having higher quality than the second processing, and the second processing being faster than the first processing.

12. A camera device, comprising:

a camera unit configured to acquire an image;

a line-of-sight detection unit configured to detect a point of eye fixation of a user within a camera screen;

an importance computation unit configured to determine levels of importance for respective areas of the image acquired by said camera unit in accordance with the detection by said line-of-sight detection unit; and a noise removal processing unit configured to change noise removal processing for the respective areas of the image in response to the determination by the importance computation unit, thereby simplifying processing for less important areas of the image compared to more important areas of the image based on comparison of the levels of importance of the less important areas of the image with the levels of importance of the more important areas of the image, wherein said noise removal processing unit performs first processing in a first area, and performs second processing in a second area that has a smaller level of importance than the first area, the first processing generating an image having higher quality than the second processing, and the second processing being faster than the first processing.

13. A camera apparatus, comprising:

a camera unit configured to acquire an image;

a line-of-sight detection unit configured to detect a point of eye fixation of a user within a camera screen;

an importance computation unit configured to determine levels of importance for respective areas of the image acquired by said camera unit in accordance with the detection by said line-of-sight detection unit; and an image processing unit configured to perform at least one of changing a number of gray scale levels for the respective areas of the image, changing color interpolation processing for the respective areas of the image, changing sharpness enhancement processing for the respective areas of the image, and changing noise removal processing for the respective areas of the image in response to the determination by the importance computation unit, thereby simplifying processing for less important areas of the image compared to more important areas of the image based on comparison of the levels of importance of the less important areas of the image with the levels of importance of the more important areas of the image, wherein said importance computation unit is configured to determine a single point as an area of importance based on the point of eye fixation and to determine the levels of importance in response to a distance between the area of importance and respective points in the image.

14. A camera apparatus, comprising:

a camera unit configured to acquire an image;

a line-of-sight detection unit configured to detect a point of eye fixation of a user within a camera screen;

an importance computation unit configured to determine levels of importance for respective areas of the image acquired by said camera unit in accordance with the detection by said line-of-sight detection unit; and an image processing unit configured to perform at least one of changing a number of gray scale levels for the respective areas of the image, changing color interpolation processing for the respective areas of the image, changing sharpness enhancement processing for the respective areas of the image, and changing noise removal processing for the respective areas of the image in response to the determination by the importance computation unit, thereby simplifying processing for less important areas of the image compared to more important areas of the image based on comparison of the levels of importance of the less important areas of the image with the levels of importance of the more important areas of the image, wherein said importance computation unit is configured to determine an area of importance based on the point of eye fixation and to determine the levels of importance according to a distribution defined by a position relative to a center of the area of importance, a size of the area of importance, and a magnitude at the center of the area of importance.

15. The camera apparatus as claimed in claim 14, wherein said area of importance has one of a circle shape and an ellipse shape.

16. A camera apparatus, comprising:

a camera unit configured to acquire an image;

a line-of-sight detection unit configured to detect a point of eye fixation of a user within a camera screen;

an importance computation unit configured to determine levels of importance for respective areas of the image acquired by said camera unit in accordance with the detection by said line-of-sight detection unit; and an image processing unit configured to perform at least one of changing a number of gray scale levels for the respective areas of the image, changing color interpolation processing for the respective areas of the image, changing sharpness enhancement processing for the respective areas of the image, and changing noise removal processing for the respective areas of the image in response to the determination by the importance computation unit, thereby simplifying processing for less important areas of the image compared to more important areas of the image based on comparison of the levels of importance of the less important areas of the image with the levels of importance of the more important areas of the image, wherein said importance computation unit is configured to determine at least two areas of importance in accordance with the detection by said line-of-sight detection unit and to determine a level of importance of any given point in response to a distance between the given point and a first one of said at least two areas of importance and a distance between the given point and a second one of said at least two areas of importance.

* * * * *